United States Patent [19]

Okita et al.

[11] Patent Number: 5,689,513
[45] Date of Patent: Nov. 18, 1997

[54] DATA TRANSMISSION SYSTEM HAVING A BACKUP TESTING FACILITY

[75] Inventors: Ryoji Okita; Tohru Ogawa; Michiko Kawada, all of Kawasaki, Japan

[73] Assignee: Fujitsu Limited, Kawasaki, Japan

[21] Appl. No.: 624,055

[22] Filed: Mar. 29, 1996

Related U.S. Application Data

[63] Continuation of Ser. No. 235,652, Apr. 29, 1994, abandoned.

[30] Foreign Application Priority Data

Aug. 6, 1993 [JP] Japan .................................. 5-195675

[51] Int. Cl.$^6$ ................................................ G06F 11/00
[52] U.S. Cl. ....................... 371/20.1; 371/68.2; 370/248
[58] Field of Search ...................... 395/183.19; 371/20.1, 371/20.2, 20.3, 20.4, 20.5, 20.6, 68.1, 68.2; 370/248, 249, 241, 242, 245, 247; 340/827

[56] References Cited

U.S. PATENT DOCUMENTS

| | | | |
|---|---|---|---|
| 4,186,380 | 1/1980 | Edwin et al. | 371/8.2 |
| 4,376,999 | 3/1983 | Abbott et al. | 370/16 |
| 4,385,392 | 5/1983 | Angell et al. | 371/8.2 |
| 4,410,983 | 10/1983 | Cope | 371/8.2 |
| 4,484,273 | 11/1984 | Stiffler et al. | 364/200 |
| 4,634,110 | 1/1987 | Julich et al. | 371/11.3 |
| 4,890,224 | 12/1989 | Fremont | 364/200 |
| 5,081,619 | 1/1992 | Nagata | 371/8.2 |
| 5,166,933 | 11/1992 | Nambu | 371/68.2 |
| 5,200,949 | 4/1993 | Kobayashi | 371/8.2 |
| 5,299,201 | 3/1994 | Carusone, Jr. et al. | 371/20.1 |
| 5,345,437 | 9/1994 | Ogawa | 371/20.1 |
| 5,345,566 | 9/1994 | Tanji et al. | 364/200 |
| 5,365,512 | 11/1994 | Combs et al. | 371/8.2 |

*Primary Examiner*—Robert W. Beausoliel, Jr.
*Assistant Examiner*—Joseph E. Palys
*Attorney, Agent, or Firm*—Staas & Halsey

[57] ABSTRACT

A data transmission system having, in addition to a normal system operation mode, a test mode wherein a plurality of stations confirm each other through sending and receiving check data for security confirmation and wherein the actual line switching operation is not performed. In the test mode, when notifying test data for confirmation of another station, the call terminating station side notifies the accurate data, while the call originating station side activating the test mode notifies deliberately changed check data thereby enabling a test for confirmation of the continuance of connection with a backup line without suspending communication with the working line.

22 Claims, 12 Drawing Sheets

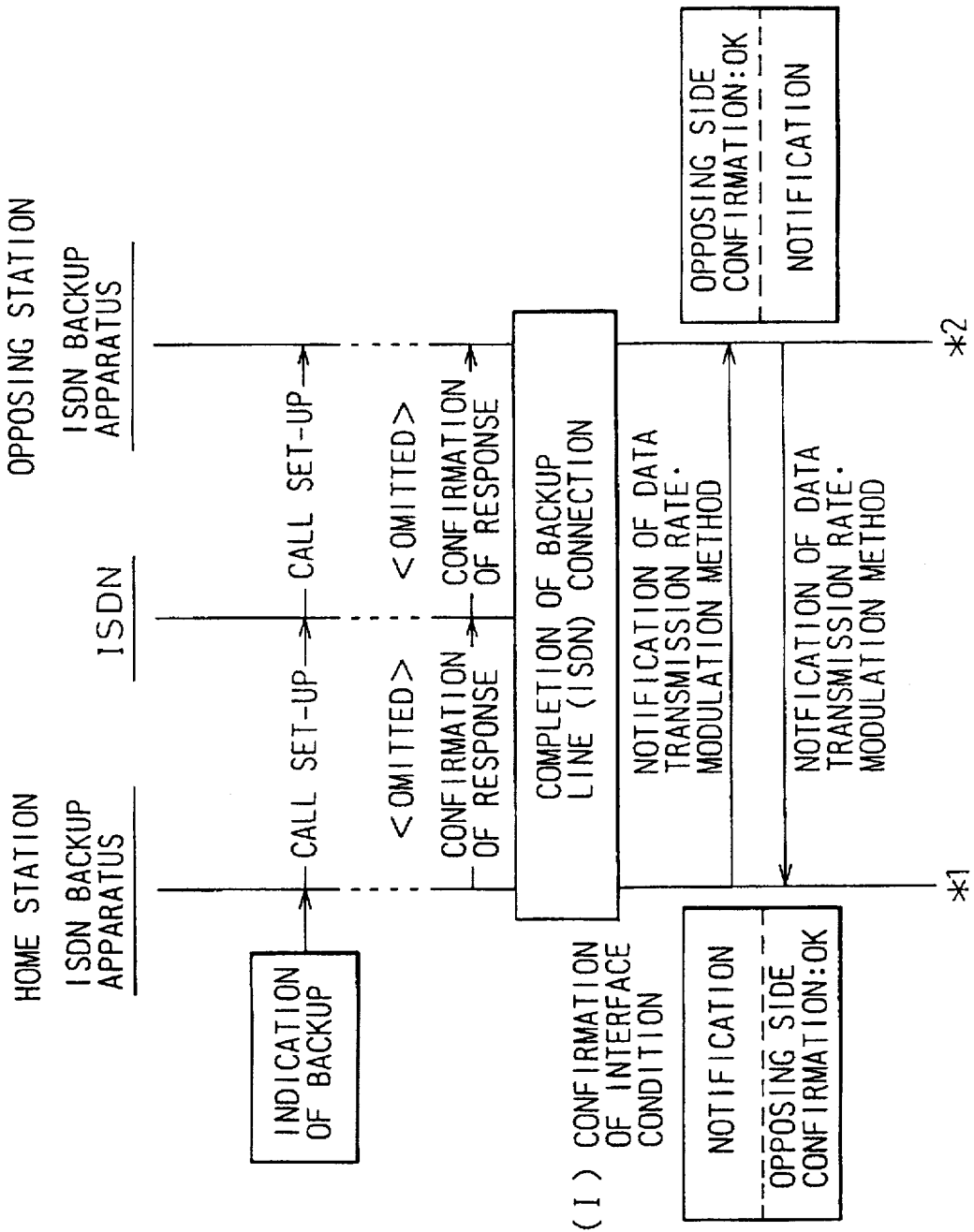

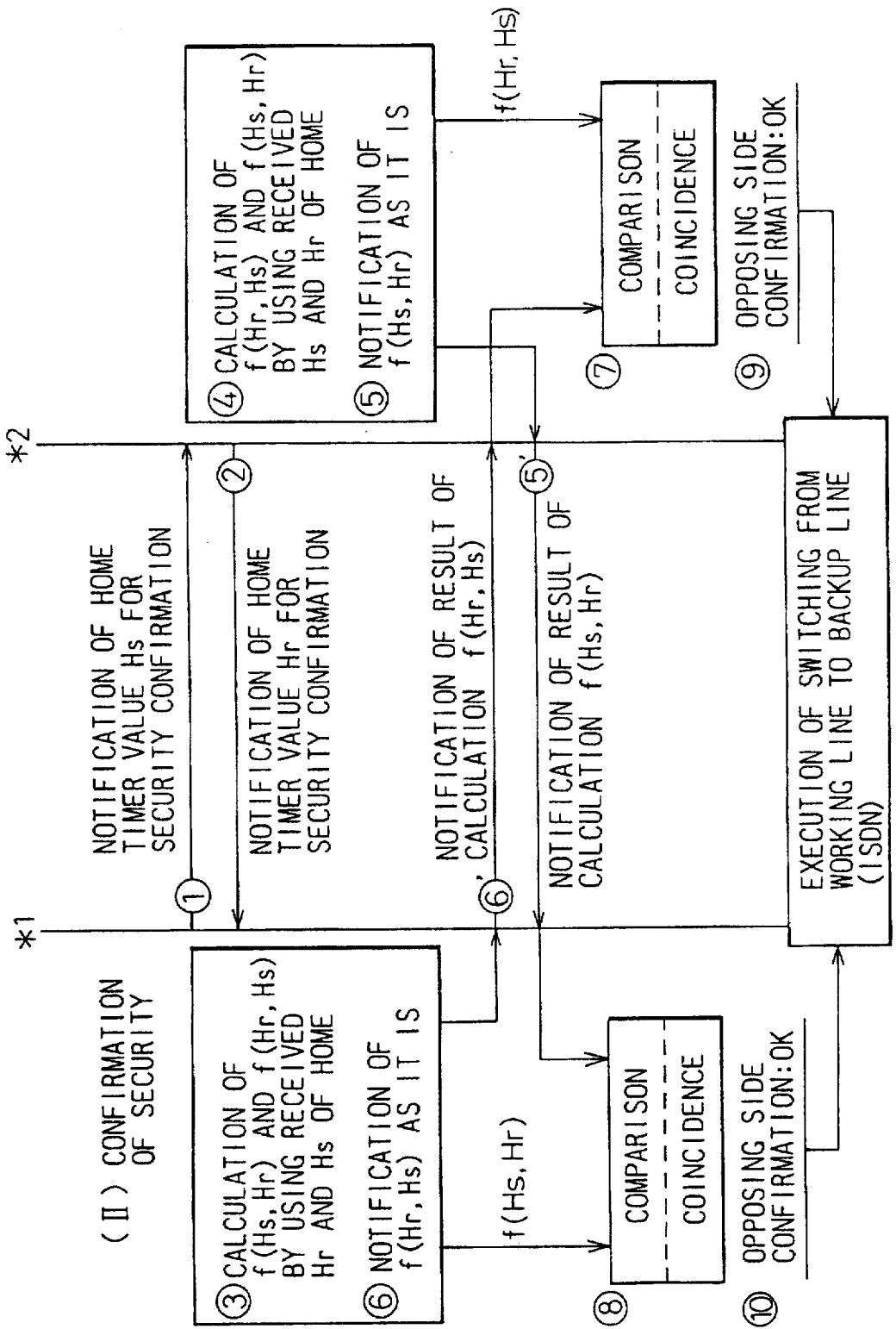

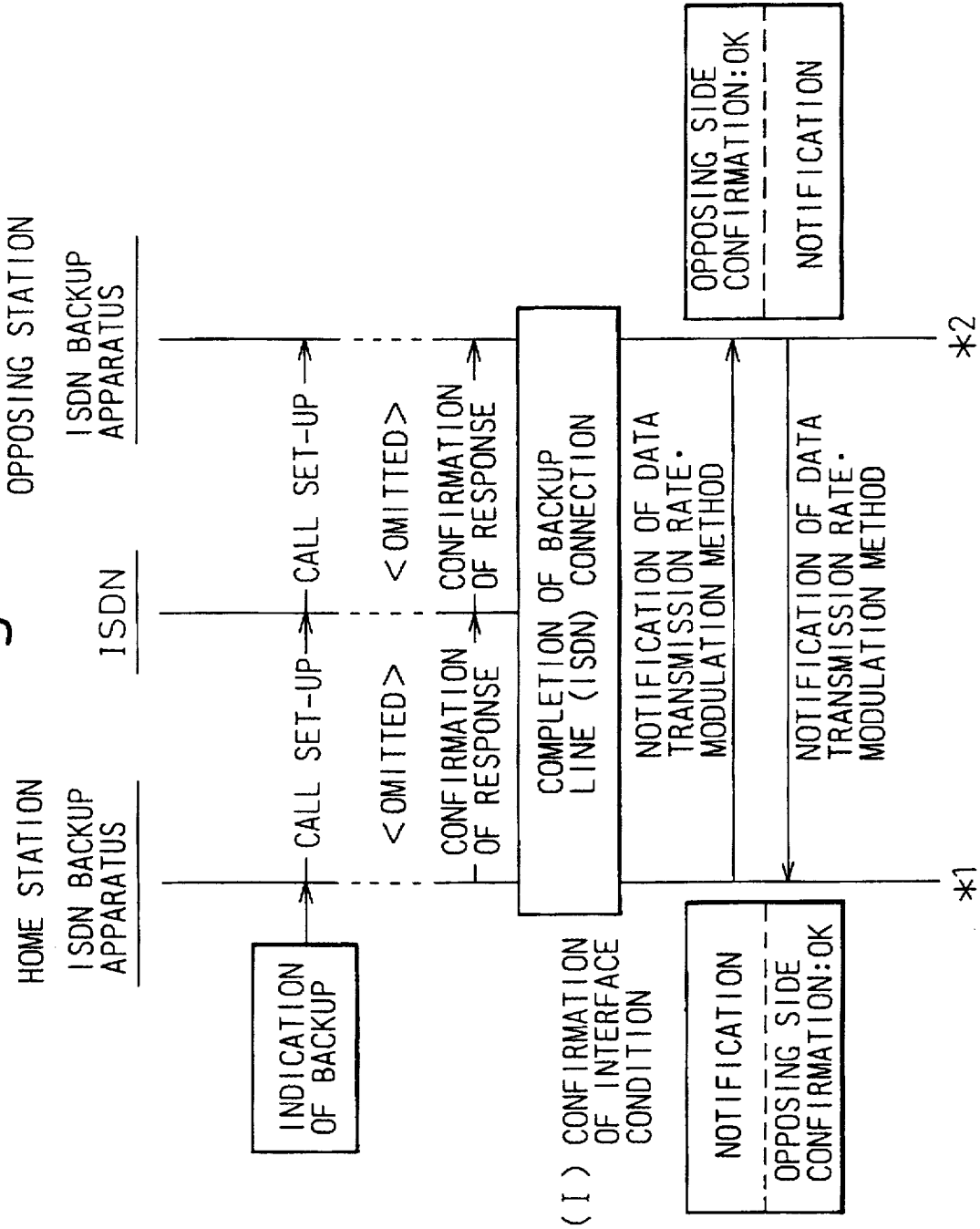

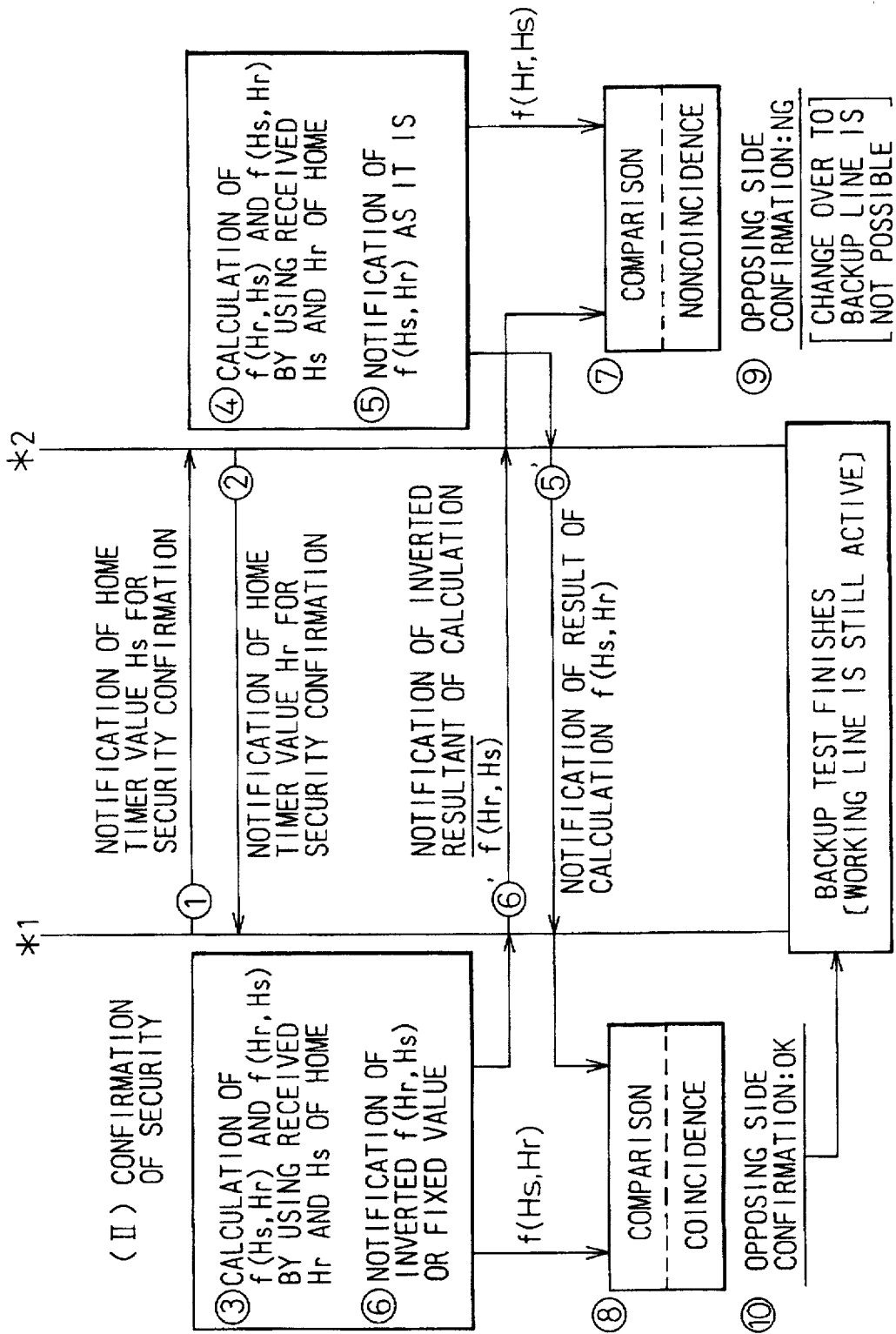

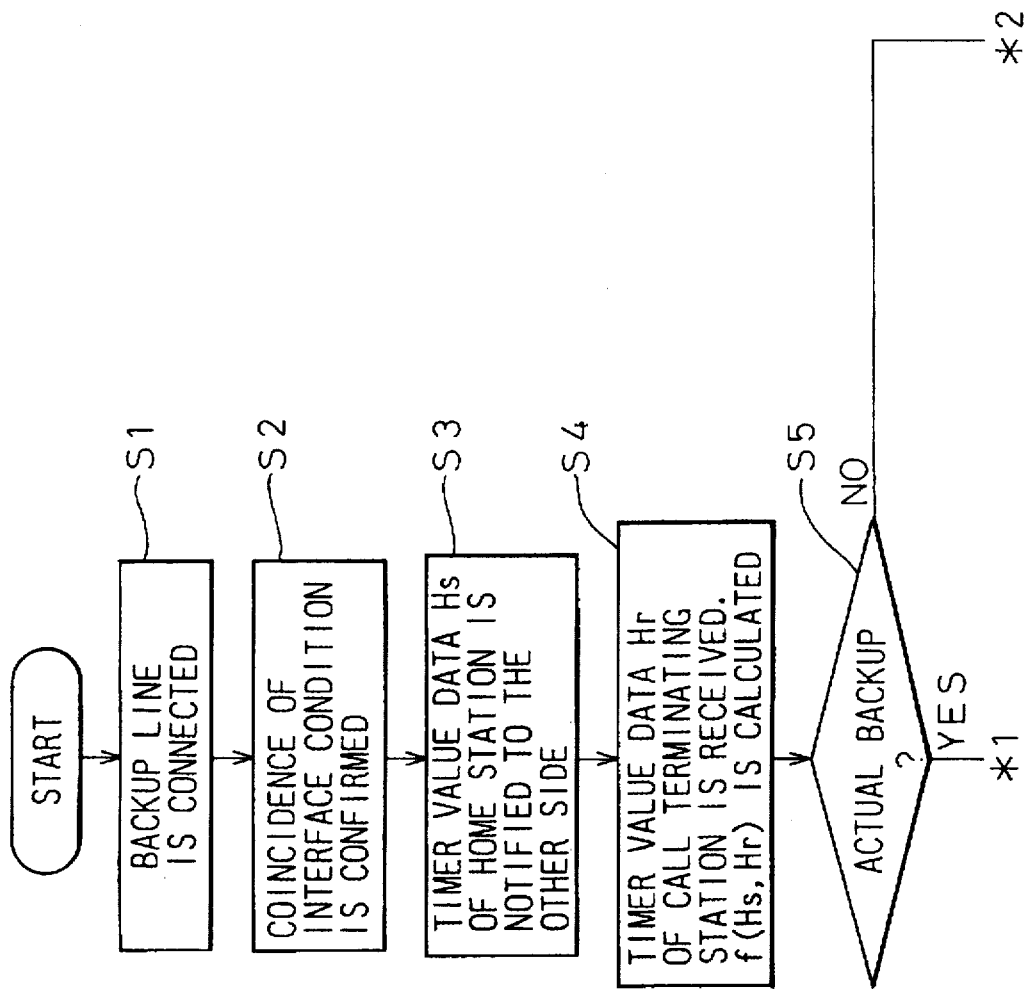

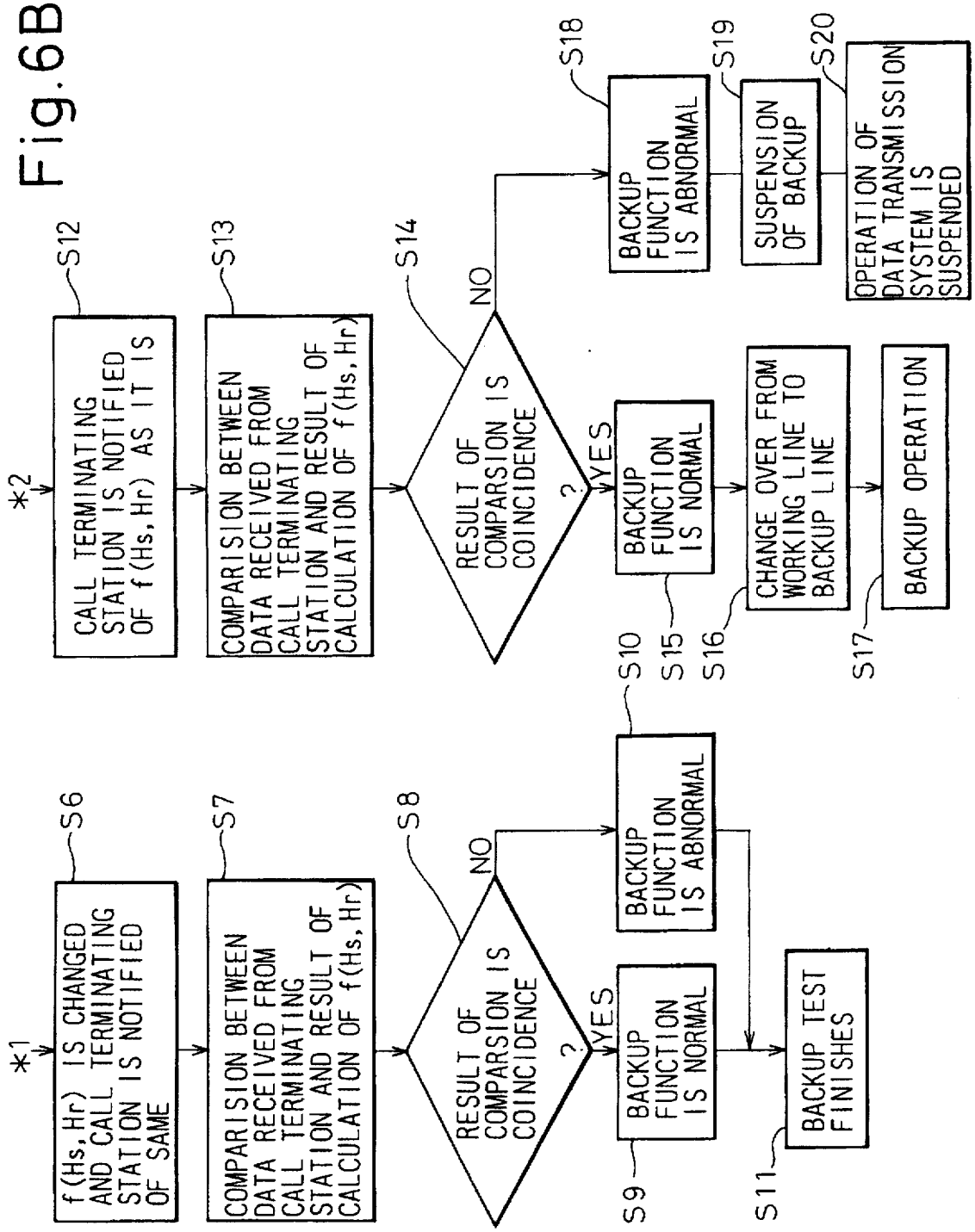

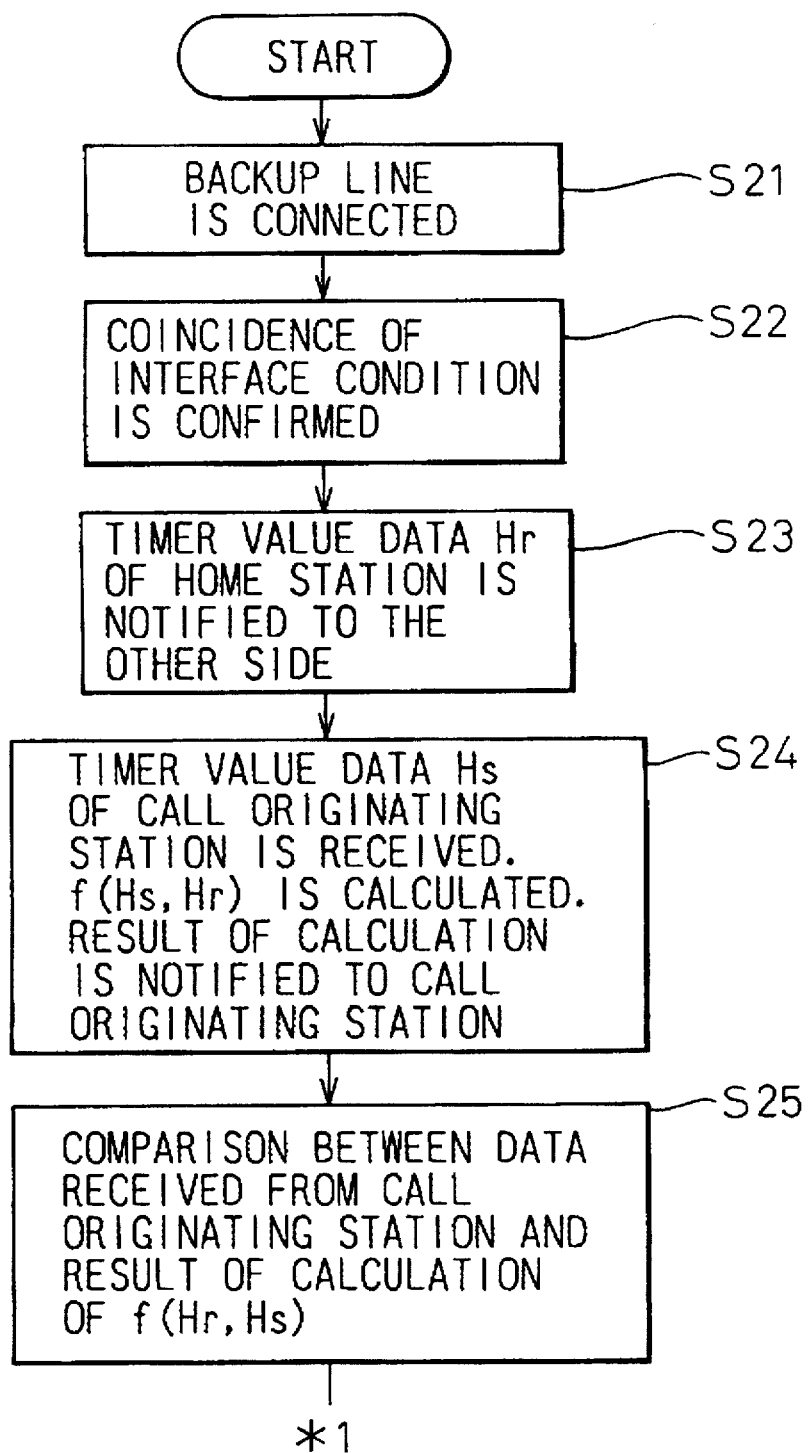

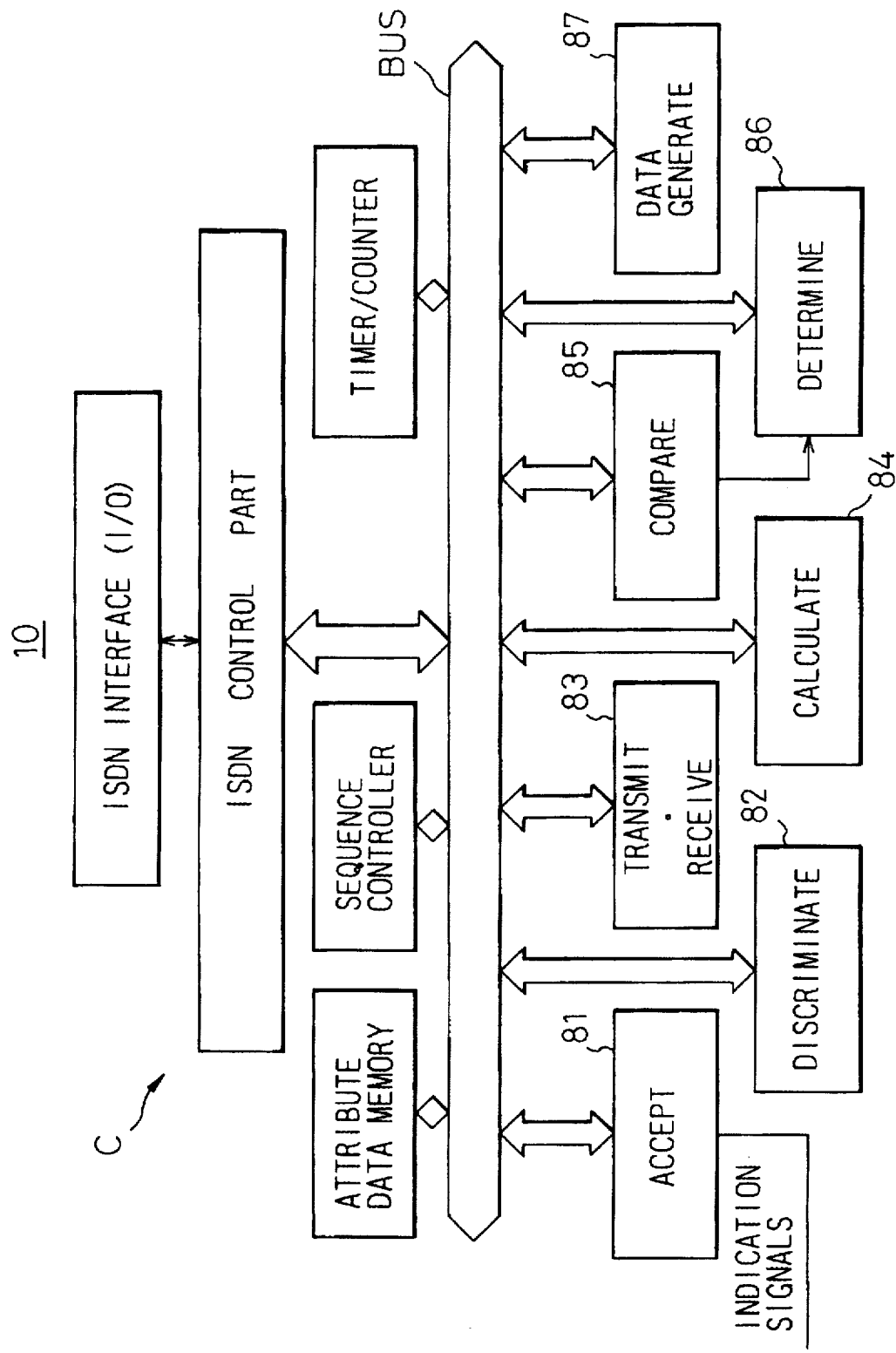

DATA TRANSMISSION SYSTEM HAVING A BACKUP TESTING FACILITY

This application is a continuation of application Ser. No. 08/235,652, filed Apr. 29, 1994, now abandoned.

BACKGROUND OF THE INVENTION

1. Field of the Invention

The present invention relates to a data transmission system having a backup testing facility. More particularly, the present invention relates to data transmission system having one or more backup lines in addition to a working line and enabling a ba ckup test for confirmation of the backup operation in preparation for possible faults in the working line.

Numerous data transmission systems are in existence wherein data of data processors, typically computer processors, are transmitted among two or more stations for use. In these transmission systems, data is transmitted between terminal equipment and a data processing center or among terminal equipment.

Even if only for a short time, any stoppage of a system transmitting important data might cause serious damage and therefore must be avoided at all costs.

In such a system, possible faults in the apparatuses at the stations are dealt with by increasing the redundancy of the apparatuses installed there. Further, the equipment and apparatuses can be operationally tested and maintained relatively easily if installed in the same local area.

As opposed to this, line faults often occur at far away locations and often are faults at facilities outside one's own station's control etc., so prevention and countermeasures against such faults are fraught with difficulties. Once a fault occurs on a line, the data stops being transmitted, so usually a backup line is provided.

The backup line has to be maintained to keep it in a state enabling switchover at any time. If this is not done, then tremendous damage would be suffered when data transmission is cut off when a fault actually occurs in a working line.

Accordingly in such a data transmission system, effort is being made to perform tests periodically or freely to confirm the backup operations, i.e., backup tests, and therefore avoid damage caused by the system going down.

2. Description of the Related Art

For such backup tests, the practice has been to suspend data transmission by the working line once, then test the switchover to the backup apparatus and backup line, then restore the working line after the test is completed. During the test period, the data transmission business comes to stop, however. This makes performance of backup tests a large burden in data transmission systems transmitting large volumes of data.

That is, as will be explained in detail later referring to the drawings, the conventional data transmission systems did not differentiate between ordinary backup operations and backup tests.

Accordingly, even when performing a backup test, the working line would actually end up switched to the backup line and the operation of the working line would have to be suspended as explained above. The test therefore could not be performed during normal business hours and would have to be performed only at night or on holidays. Therefore, there was the problem of disadvantages in work efficiency and expenses.

Due to the above-mentioned reasons, the frequency of testing tended to be low and there was the problem of a chance of inability of line switching when a fault actually did occur and therefore serious damage inflicted.

SUMMARY OF THE INVENTION

Accordingly, the present invention was made in consideration of the above-mentioned problems and has as its object provision of a data transmission system having a backup test facility which enables a test for confirming a backup operation in parallel even during transmission of data using the working line and without actually entering into the switching to the backup line and, further, enables the changes affecting the existing system construction to be held to a minimum.

To attain the above object, the present invention provides a data transmission system having a backup testing facility where a working line engaged in data transmission is switched to a backup line when a fault occurs in the working line and the data transmission is continued between transmission apparatuses through the backup line, wherein said data transmission system forms a test mode wherein the transmission apparatuses transmit and receive check data among each other so that the transmission apparatuses confirm the security of the other parties and thereby confirm whether the backup line is normal or not and, even when confirming that the backup line is normal, do not actually switch the working line to the backup line.

BRIEF DESCRIPTION OF THE DRAWINGS

The above object and features of the present invention will be more apparent from the following description of the preferred embodiments with reference to the accompanying drawings, wherein:

FIGS. 3A and 3B are sequence diagrams showing the conventional backup operation;

FIGS. 5A and 5B are sequence diagrams showing an example of a backup operation of the present invention;

FIGS. 6A and 6B are flow charts of an example of the operation of a backup test according to the present invention for a call originating transmission apparatus;

FIGS. 7A and 7B are flow charts of an example of the operation of a backup test according to the present invention for a call terminating apparatus; and FIG. 8 is a view of an example of the configuration of a data transmission apparatus according to the present invention.

DESCRIPTION OF THE PREFERRED EMBODIMENTS

Before describing the embodiments of the present invention, the prior art and the problems therein will be first described with reference to the related figures.

Figure 1:
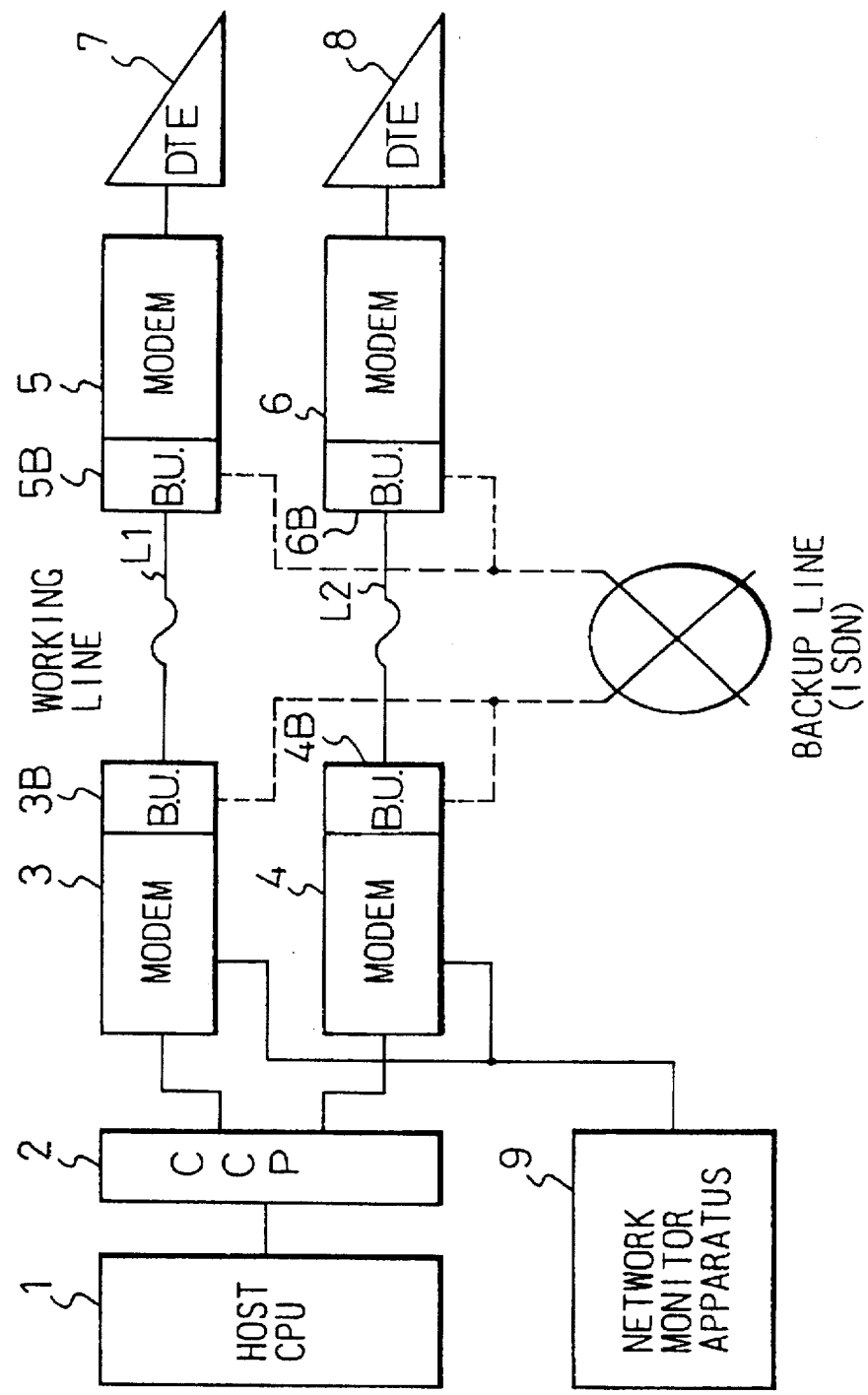
FIG. 1 is a view of an example of the configuration of a conventional data transmission apparatus having a backup testing facility.

FIG. 1 is a view of an example of the configuration of a conventional data transmission apparatus having a backup testing facility. Note that as the backup line, use is made of an integrated services digital network (ISDN). A host central processing unit (CPU) 1 is connected through a communication control processor (CCP) 2 to a modem 3 and modem 4 where it is connected through leased lines, i.e., the working lines L1 and L2, through the modem 5 and modem 6 of the opposing station side to data terminal equipment (DTE) 7 and 8.

The modems 3 to 6 have belonging to them the ISDN backup (BU) apparatuses 3B, 4B, 5B, and 6B through which they are connected to the ISDN serving as the backup lines as shown by the broken lines. Note that the existence of abnormalities of the network is monitored by a network monitor apparatus 9.

In such a configuration, the modems 3 and 4 are directly monitored by a monitoring signal of the network monitor apparatus 9, while the modems 5 and 6 are monitored by the monitor signal transmitted through the lines.

In this monitoring operation, when an abnormality is recognized in the working line L1 or L2, the backup apparatus connected to the line in use among the ISDN backup apparatuses 3B, 4B, 5B, and 6B is made to operate and a backup operation is started by the backup line ISDN.

This line backup in the data transmission system is performed by originating a call to the other station and confirming the security at the point of time when a fault is detected in a working line L1 or L2 and switching from the faulty working line L1 or L2 to a connectable backup line.

Figure 2:
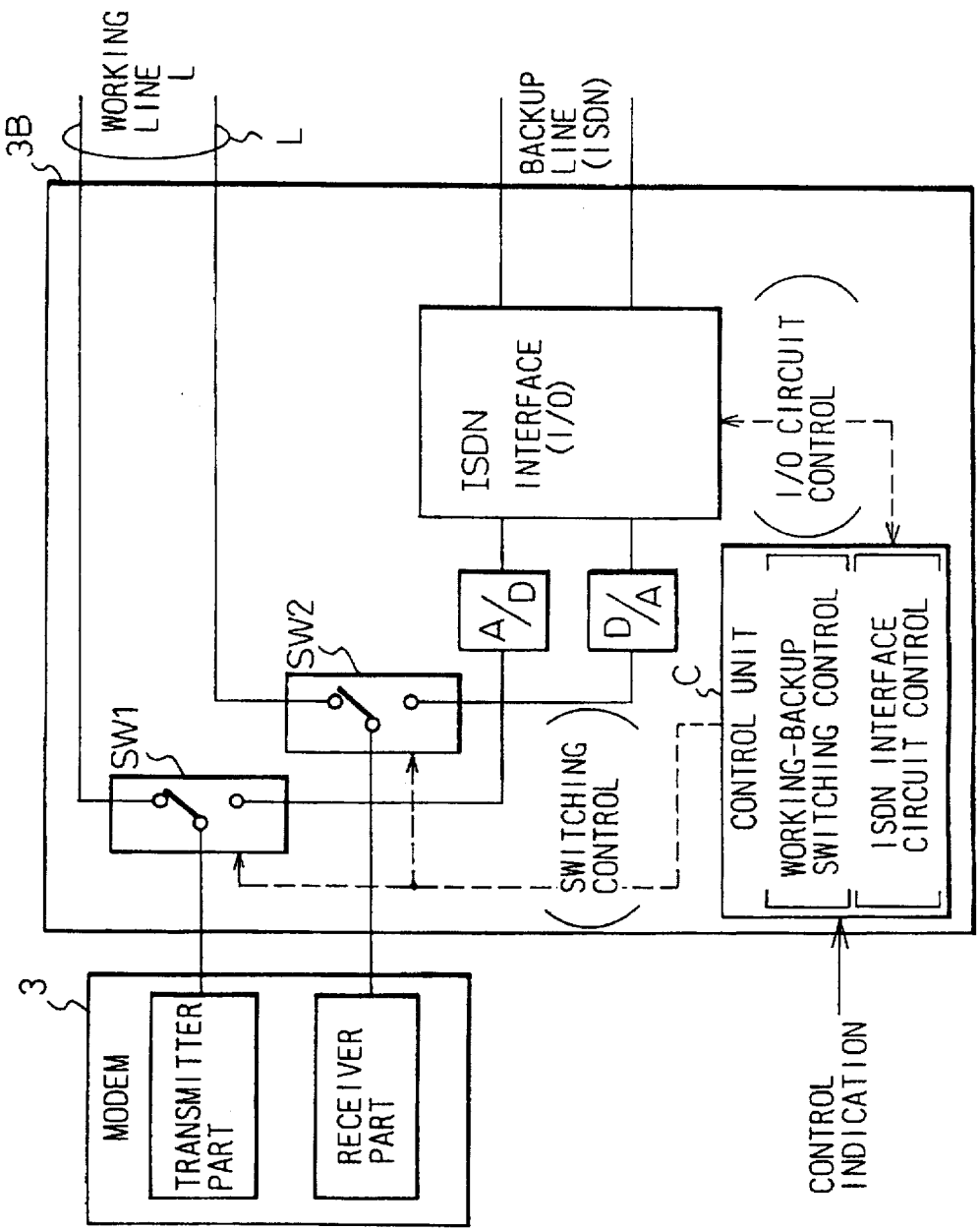
FIG. 2 is a view of a specific example of a conventional backup apparatus.

FIG. 2 is a view of a specific example of a conventional backup apparatus. Strictly speaking, this shows a concrete example of a typical modem 3 and ISDN backup apparatus 3B. The ISDN backup apparatus 3B has switches SW1 and SW2 for switching connection between a current working line L and a backup line, that is, ISDN, under the control of a control unit C.

Note that at the ISDN side, the ISDN and modem 3 are connected through an analog/digital converter A/D, a digital/analog converter D/A, and an ISDN interface I/O.

The ISDN interface I/O performs bipolar/unipolar conversion of the ISDN signal, a layer-1 function, a layer-2 decomposition/composition function, a line connection control function, etc. by the control of the control unit C.

FIGS. 3A and 3B are sequence diagrams showing the conventional backup operation and show the sequence of the backup operation in the above-mentioned data transmission system.

When receiving a backup instruction, a station sets up a call from its own ISDN backup apparatus to the ISDN. The ISDN sets up a call to the ISDN backup apparatus of the opposing station. After this, connection is established with the ISDN at the time when a final response is confirmed through predetermined protocol.

After the connection with the ISDN is completed, the interface conditions are confirmed. The protocol notifies the interface conditions, such as the modem data transmission rate and modulation method, of the two stations to each other and confirms that the interface conditions match.

After this, the mutual security is checked. This is so that the call originating station can confirm if the other station is truly correct. For the purpose of the security confirmation, one station notifies the opposing station of its timer value Hs and at the same time receives a timer value Hr notified from the opposing station.

The first station then calculates the function f(Hs, Hr) and f(Hr, Hs) using as variables the current timer value Hs in the apparatus and the timer value Hr received from the opposing station.

In the same way, the opposing station then calculates the function f(Hr, Hs) and f(Hs, Hr) using as variables the current timer value Hr in the apparatus and the timer value Hs received from the opposing station.

The thus calculation results are notified to each other station, the received calculation results are compared against the calculation results of the station which have been calculated in advance, and if the results match, the confirmation of the other party is ended, the working line used up to then is switched to the ISDN, and the backup switching control operation is completed.

Note that if the compared results do not match, it means that it has been judged in the process of the security confirmation that the opposing station was not correct, so the backup switching control operation is terminated.

Therefore, as mentioned earlier, the conventional data transmission systems did not differentiate between ordinary backup operations and backup tests. Accordingly, even when performing a backup test, the working line would actually end up switched to the backup line and the operation of the working line would have to be suspended as explained above. The test therefore could not be performed during normal business hours and would have to be performed only at night or on holidays. Therefore, there was the problem of disadvantageousness in work efficiency and expenses.

The present invention provides a data transmission system having a data transmission system having one or more backup lines in addition to a working line and enabling a backup test for confirmation of the backup operation in preparation for possible faults in the working line.

Figure 4:
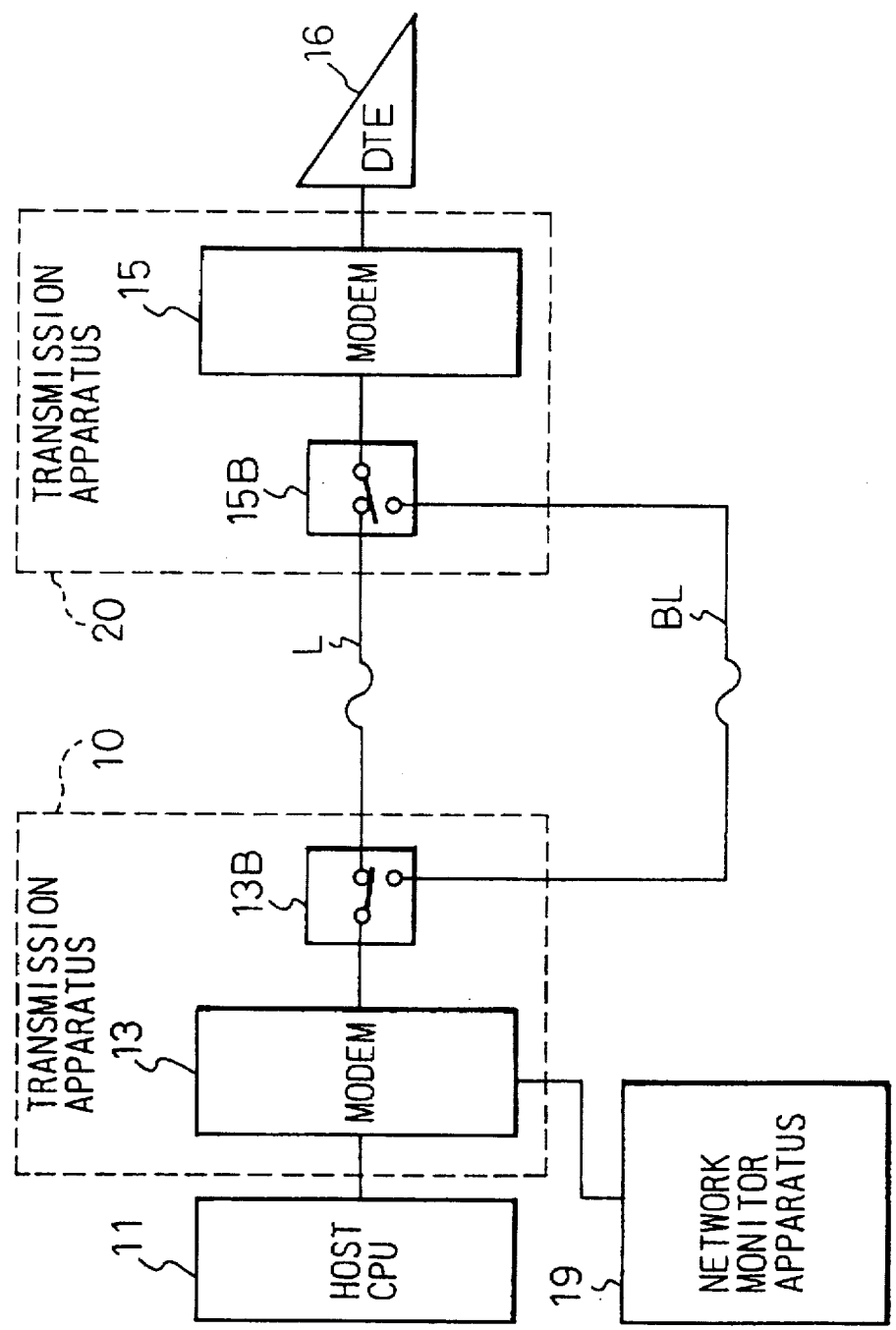
FIG. 4 is a view of an example of the configuration of a data transmission system making use of the backup test according to the present invention.

FIG. 4 is a view of an example of the configuration of a data transmission system making use of the backup test according to the present invention.

The goal of the present invention is to achieved by a data transmission system having a service mode for transmitting data from a CPU 11 through modems 13 and 15 switching to a backup line BL when a fault occurs in the working line L engaged in data transmission, wherein provision is made of a backup test mode for confirming the backup operation by the backup line BL without suspending communication on the working line L.

Note that between the modems 13 and 15 can be interposed backup apparatuses 13B and 15B and that the existence of faults in the system as a whole is monitored by the network monitor apparatus 19.

The data transmission system in this case has, in addition to the normal system operation mode, a test mode wherein just the stations confirm each other through sending and receiving check data for security confirmation and the actual line switching operation is not performed. That is, in each of the backup apparatuses 13B and 15B, the illustrated switch contacts are kept connected to the working line L side and the backup line BL side is tested.

In the above test mode, the check data exchanged for confirming the security of the other stations is notified accurately by the call terminating station side, while deliberately modified data or artificially constructed fixed data is notified from the call originating station side activating the test mode.

That is, the data transmission system of the present invention comprises the steps of a) in the test mode, when check data for confirming the security of the other party is notified from the transmission apparatus on the call originating side starting the test mode to the transmission apparatus on the call terminating side, having the transmission apparatus on the call terminating side notify the transmission apparatus on the call originating side of the check data correctly responding to that notification and b) in the test mode, when check data for confirming the security of the other party is notified from the transmission apparatus on the call originating side to the transmission apparatus on the call terminating side, having the transmission apparatus on the call originating side notify the transmission apparatus on the call terminating side of check data incorrectly responding to that notification, that is, deliberately modified data or artificially constructed fixed data, thereby performing a test for confirmation of the connection of the backup line between transmission apparatuses by disabling the backup switching at the transmission apparatus on the call originating side and continuing the data transmission on the working line.

In the above case, there may be further included a step of detecting at said call originating transmission apparatus if execution of the test mode has been instructed from the outside and, when detecting that execution of the test mode has been instructed from the outside during that step, executes the above-mentioned steps a) and b).

The deliberately modified check data or fixed data mentioned above includes data enabling the other station to be confirmed as abnormal despite the check data from the call originating side being normal and includes data for suspending the subsequent backup operation.

That is, in the present invention, the content of the deliberately modified data or artificially constructed fixed data notified from the transmission apparatus on the call originating side activating the test mode has content enabling judgement of abnormal security in the confirmation of security at the call terminating transmission apparatus despite the fact that the check data notified from the transmission apparatus on the call terminating side is normal, whereby after the judgement, the transmission apparatus on the call terminating side suspends the switching from the working line to the backup line.

According to the backup test of the present invention, if the test mode is selected, a call origination operation is performed from one station to another station through the backup line. After a predetermined operation following this call origination operation, the connection of the backup line is confirmed, then check data for confirming the other station are sent and received so that the stations can confirm the security of each other.

When the other station is confirmed in this way, the other station sends the accurate confirmation data to the call originating station activating the test mode. As opposed to this, the call originating station sends to the other station deliberated changed confirmation data, for example, bit inverted data, or fixed data composed of predetermined conditions.

That is, the call terminating transmission apparatus does not change the check data sent to the call originating transmission apparatus 10 in the test mode by deliberately modifying the data or artificially constructing data such as done by the call originating transmission apparatus 10.

As a result, it can be confirmed at the call originating station side (10) activating the backup test that the backup operation is performed normally using the confirmation data sent back from the other station (20).

However, the confirmation data sent back from the call originating station (10) side to the other station (20) is either deliberately changed by bit inversion etc. or else is fixed data not possible under ordinary circumstances, so naturally does not match.

Accordingly, the other station (20) suspends the switching operation to the backup line BL and continues the data transmission by the working line L in use up to then.

The deliberately changed data is data obtained by performing bit inversion on the normal check data sent during confirmation of security.

Alternatively, the deliberately changed data is data obtained by randomizing by a scrambler the normal check data sent during confirmation of security.

Using the backup test, that is, the test for confirming the backup operation, it is possible to confirm that the backup operation at the call originating switching apparatus 13B activating the test, the backup line, the switching apparatus 15B at the other station, etc. is normal and the actual switching operation from the working line L to the backup line BL is reliably hindered.

Accordingly, it is possible to confirm the backup operation at any time, periodically or upon emergencies, without any hindrance to the operation of the working line L in the middle of data transmission.

FIGS. 5A and 5B are sequence diagrams showing an example of a backup operation of the present invention.

Below, the present invention will be explained based on FIGS. 5A and 5B showing an embodiment. The first embodiment of the present invention is comprised using an ISDN as the backup line BL. Here, the station at the left noted as the "home station" is the station (10) activating the backup test mode, while the right side shows the opposing station (20). As the backup line BL, use may be made of a usual analog telephone network in addition to an ISDN.

In this embodiment, in the backup test mode, a backup test is instructed from the network monitor apparatus 9. Receiving this instruction, a call is set from the modem of the home station through the ISDN backup apparatus 13B to the ISDN. Note that the backup test operation can be activated by manual operation from a test switch on the control panel provided in the backup test apparatus.

Further, a call is set up from the ISDN to another station specified by the call and the test line is connected by the ISDN forming the backup line.

When this connection is completed, data confirming the interface conditions is transmitted and received between the call originating station and the other station. The interface conditions include confirmation data as to if the data transmission speed, modulation method, etc. of the modem used are within allowable ranges.

It is confirmed if the transmission speed is one of 2400, 4800, ... 19.2 kbit/s, etc. and which system the modulation system corresponds to: V.26, V.29, V.33, etc. of the CCITT recommendations.

After this, data is transmitted for the security confirmation. For example, the call originating station sends the current timer value Hs in the apparatus to the other station 20 and the other station 20 sends the timer value Hr to the call originating station. The timer values may be the time elapsed from the start of the backup operation as well or may be the time at that time as well.

These timer values Hs, Hr are used as variables for calculation of the functions f(Hs, Hr) and f(Hr, Hs) at the two. The call originating station deliberately changes the calculation results and sends the results to the other station, while the other station sends the calculation results to the call originating station as they are.

The deliberately changed calculation results in this case mean the calculation results obtained with the bits inverted or fixed values comprising realistically impossible figures, for example, combinations of all 1 or all 0.

As a result, the call originating station activating the backup test confirms if the results it has calculated itself and the calculation results at the other station sent from the other station match and confirm the other station is OK if the interface conditions and security information of the other station are normal and therefore confirms that the backup conditions are satisfied. After this, the call originating station ends the backup test.

As opposed to this, since the results calculated at the other station 20 and the test results sent from the call originating station 10 differ, the security information is defective and therefore the other party is not confirmed at being OK, a change of connection of the backup line is judged impossible, and the backup operation is suspended. The test for confirming the backup operation at this time is ended and data transmission by the working line is continued as before.

The difference between the actual backup operation in this case and the test for confirming the backup operation lies in whether deliberately changing the data transmitted from the call originating station to the other station in the backup test when exchanging the security information.

Accordingly, by providing the station activating the backup test with a test mode having a function of deliberately changing the calculation results which are sent, it becomes possible to perform a backup test without having any effect on the state of data transmission by the working line.

As mentioned above, the check data is timer values of the transmission apparatuses (10, 20) at the time of execution of the confirmation of security. The transmission apparatuses perform calculation by identical predetermined functions using as variables both the timer value obtained from the other party and their own timer values and send the results of calculation obtained at the transmission apparatuses to the other parties. At this time, the calculation results are sent to the other parties as they are at step a) and calculation results different from the above calculation results are sent at step b).

In this case, the security information transmitted between transmission apparatuses is not limited to the abovementioned timer values or calculation results using the same. For example, the security information transferred among the transmission apparatuses may be made the telephone numbers unique to the transmission apparatuses. The calculations using the telephone numbers may be enciphering processing using a key common to the two transmission apparatuses.

FIGS. 6A and 6B are flow charts of an example of the operation of a backup test according to the present invention for a call originating transmission apparatus. More particularly, these figures are flow charts of the operation at the call originating station for explaining the relationship between a test for confirming the backup operation of the present invention (see FIGS. 5A and 5B) and a usual backup operation (see FIGS. 3A and 3B).

Along with the start of the backup test, the call originating station activating the backup mode and the other station confirm each other through sending out a call and response and connect the backup line (step S1).

Then, the necessary conditions among the interface conditions are confirmed (step S2).

After this, suitable data, for example, the timer value Hs of the call originating station, is sent from one station to another station (step S3). The call originating station receiving the data from the call terminating station, for example, the timer value Hr of the call terminating station, calculates the function f(Hr, Hs) using the received data Hr as the variable.

Next, it is judged if the operation is a backup test or inherent backup switching (step S5). If a backup test, the call originating station deliberately modifies the function f(Hr, Hs) calculated by inversion etc. or constructs artificial fixed data etc. and notifies the call terminating station of the same. After this, the calculation results f(Hr, Hs) at a home station for specifying the call terminating station and the function received from the call terminating station are compared (step S7).

It is judged if the results of the comparison match or not (step S8). If they match, it is considered that the backup is normal (step S9) and the backup test is ended (step S11). If they do not match, the backup is considered abnormal (step S10) and the backup test is ended.

On the other hand, when it is judged that the series of operations is not a backup test (step S5), the function f(Hs, Hr) of the results of calculation at a home station is notified accurately to the call terminating station (step S12). Along with this, the function received from the call terminating station and the calculation results at the home station f(Hr, Hs) are compared (step S13) and it is judged if the results of the comparison match or not (step S14).

When the compared results match, the backup is normal (step S15), so the working line is switched to the backup line (step S16) and the backup operation is performed (step S17).

As opposed to this, when the compared results do not match, the backup is abnormal (step S18), so the backup operation is suspended (step S19) and the use of the transmission system is suspended (step S20).

In this way, the call originating station activating the backup test is notified with the correct data from the call terminating station, so normally the data should match and the backup function judged normal. If not matching here, then the backup function is judged abnormal.

Figure 7B:
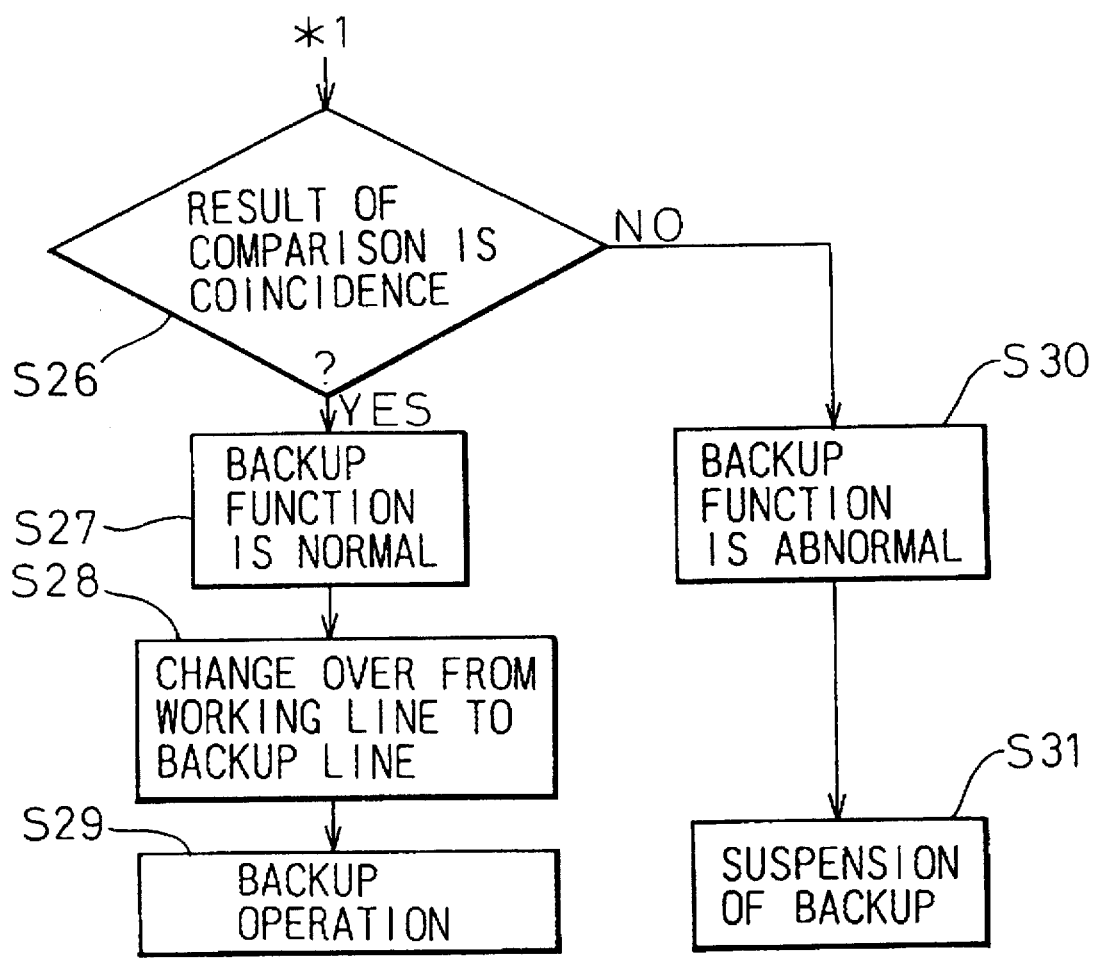

FIGS. 7A and 7B are flow charts of an example of the operation of a backup test according to the present invention for a call terminating apparatus. More particularly, these figures are flow charts of the operation at the call terminating station for explaining the relationship between the test for confirming the backup operation of the present invention (see FIGS. 5A and 5B) and the normal backup operation (see FIGS. 3A and 3B).

Along with the start of the flow, the backup line is connected through the procedures of calling and response with the call originating station (step S21), then the match of the interface conditions of the two stations is confirmed (step S22).

After this, the call originating station is notified with the suitable data, for example, the timer value Hr of the call terminating station (step S23). Further, the call terminating station receiving the data from the call originating station, for example, the timer value Hs of the call originating station, calculates the function f(Hs, Hr) using the received data Hs as a variable (step S24).

Next, a comparison is made between the function received from the call originating station side and the calculation results f(Hs, Hr) for specifying the other station at a home station (step S25). If the compared results match (step S26), the backup operation is judged normal (step S27). As a result, the working line L is switched to the backup line BL (step S28) and the backup operation is executed (step S29).

As opposed to this, if the compared results do not match (step S26), the backup operation is judged abnormal (step S30). As a result, the subsequent backup operation is canceled (step S31).

In this way, if the comparison at the call terminating station shows noncoincidence, the backup operation is canceled. In this way, in the case of a backup test, the results never match since deliberately changed data or normally impossible fixed data is sent from the call originating station.

Accordingly, if the answer is no at the stage of confirmation of the security information, the backup is automatically considered abnormal, the subsequent operation is canceled, and the transmission of data by the working line is continued.

When a backup operation becomes needed due to a line fault etc., however, normal data is sent from the call originating station as well, so there should be a match and the normal backup operation is ensured.

As opposed to this, even in the case of a backup test, normal data is sent from the call terminating station, so judgement of the normality/abnormality of the backup test system becomes possible at the call originating station.

FIG. 8 is a view of an example of the configuration of a data transmission apparatus according to the present invention.

The data transmission apparatus 10 having a backup testing facility according to the present invention may include a backup testing unit C, which backup testing unit C is operative in the working mode to switch a working line L engaged in data transmission and suffering from a fault to a backup line BL and continue the transmission of data between the transmission apparatuses through the backup line B.

The backup testing unit C is operative in the test mode to have the transmission apparatuses (10, 20) send and receive check data between themselves so that the transmission apparatuses confirm the security of each other and thereby confirm if the backup line BL is normal or not and, if confirming that the backup line BL is normal, terminates the operation for switching the working line L to the backup line BL.

More specifically, as illustrated, the backup testing unit C included in the apparatus 10 at the side activating the test mode is provided with a first means 81 for receiving instruction signals from the outside and a second means 82 for judging if the instruction signal received by the first means 81 is an instruction signal instructing the execution of the test mode.

Further, the backup testing unit C included in the apparatus may be provided with a third means 83 for sending said check data to a call terminating transmission apparatus 20 and receiving and holding the check data from the call terminating transmission apparatus 20, a fourth means 84 for performing predetermined calculations on the said sent check data and received check data, a fifth means 85 for comparing predetermined calculation results obtained by the above predetermined calculations and predetermined calculation results received from another party performing similar predetermined calculations, and a sixth means 86 for detecting if the above compared results coincide and when detecting coincidence judges that the backup line for the connection with the call terminating transmission apparatus is normal.

The backup testing unit C included in the apparatus 10 may be further provided with a seventh means 87 for producing and sending to said call terminating transmission apparatus calculation results different from the calculation results obtained by applying said predetermined calculation on the said sent check data at the fourth means 84 when said sixth means 86 judges that the backup line BL for connection with the call terminating transmission apparatus 20 of another party is normal.

Among the above-mentioned means, the following three means (1), (2), and (3) characterize the present invention in comparison with the prior art:

(1) a discriminating means 82 for judging if an instruction signal has been given instructions for execution of the test mode, (2) a determining means 86 for judging that the backup line BL for connection with the call terminating transmission apparatus 20 of another party is normal and suspending the switch from the working line L to the backup line BL after the confirmation of security is completed, and (3) a data generating means 87 for applying further processing to the calculation results obtained by applying the predetermined calculation to the check data to be sent from the call originating transmission apparatus 10 so as to produce and send to the call terminating transmission apparatus 20 of the other party calculation results different from the said calculation results when judging that the backup line BL for connection with the call terminating transmission apparatus 20 is normal.

According to the present invention, it becomes easy to perform a backup test without switching the working line and therefore without suspending the data transmission operation on the working line.

Therefore, it becomes possible to perform the backup test at any time, not just at night or on holidays. Further, it may be confirmed if the data transmission system including the working line and backup line is normal or not by performing tests at a high frequency, for example, performing tests at a set time every week or several times during working days.

According to the backup test system of the present invention, it is necessary to provide an apparatus performing the backup test which has a test mode having the function of deliberating changing calculation results and sending the same. This apparatus may be installed at all stations of the transmission system.

However, it is possible to perform the backup test just at the station starting the backup test and not make any modifications to other stations.

For example, in a system formed with a plurality of terminal stations and a central station, it is possible to confirm the state of backup with the terminal stations and expect a superior effect even in terms of economy by installing the backup test apparatus according to the present invention just at the central station.

What is claimed is:

1. A data transmission system having a backup testing facility, the data transmission system comprising:

at least two transmission apparatuses, one is a home data transmission apparatus and the other is an opposing data transmission apparatus both connected by both a working line and a backup line which is switched from the working line when an actual fault occurs in the working line in a normal mode, so as to continue a data transmission through the backup line, wherein said home data transmission apparatus is operative to start a backup line test in a test mode between the home data transmission apparatus and said opposing data transmission apparatus by transmitting a call to the opposing data transmission apparatus, via said backup line, and said at least two data transmission apparatuses each comprise check data generating means, check data transmitting means and check data receiving means for generating, transmitting and receiving check data among each other so that the home data transmission apparatus confirms whether the backup line is normal or not without switching from the working line to the backup line idle in the test mode, the check data generating means is coupled to the check data transmitting means and the check data receiving means.

2. A data transmission system as set forth in claim 1, wherein, in the test mode, when the opposing data transmission apparatus receives first downstream check data transmitted from said check data generating means of said home transmission apparatus, said opposing data transmission apparatus transmits second upstream check data, created by raid check data generating means of said opposing data transmission apparatus using the first down stream check data, to the home data transmission apparatus, and when the home data transmission apparatus receives first upstream check data transmitted from said opposing data transmission apparatus, said home data transmission apparatus transmits second downstream check data, created by said check generating means of said home transmission apparatus using the first downstream check data, to the opposing data transmission apparatus.

3. A data transmission system as set forth in claim 2, wherein said home data transmission apparatus, which activates said test mode, produces said second downstream check data composed of deliberately modified data or artificially constructed fixed data to incorrectly respond to said opposing data transmission apparatus, so that the opposing data transmission apparatus initiates no switching from said working line to said backup line.

4. A data transmission system as set forth in claim 3, wherein said second downstream check data is data obtained by the check data generating means of the home transmission apparatus performing bit inversion on normal second downstream check data to be sent back to said opposing data transmission apparatus if said actual fault occurs.

5. A data transmission system as set forth in claim 3, wherein said second downstream check data is data obtained by said check data generating means randomizing normal second downstream check data to be sent back to said opposing data transmission apparatus if said actual fault occurs.

6. A data transmission system as set forth in claim 2, wherein said home data transmission apparatus activates said test mode if the home data transmission apparatus is instructed to carry out a backup line test from an external monitor.

7. A data transmission system having a backup testing facility, the data transmission system comprising:

at least two transmission apparatuses, one is a home data transmission apparatus and the other is an opposing data transmission apparatus both connected by both a working line and a backup ling which is switched from the working line when an actual fault occurs in the working line in a normal mode, so as to continue a data transmission through the backup line, wherein said home data transmission apparatus is operative to start a backup line test in a test mode between the home data transmission apparatus and said opposing data transmission apparatus by transmitting a call to the opposing data transmission apparatus, via said backup line, and said at least two data transmission apparatus transmit and receive check data among each other so that the home data transmission apparatus confirms whether the backup line is normal or not without switching from the working line to the backup line idle in the test mode, wherein when the opposing data transmission apparatus receives first downstream check data transmitted from said home transmission apparatus, said opposing data transmission apparatus transmits second upstream check data, created by said opposing data transmission apparatus using the first down stream check data, to the home data transmission apparatus, wherein when the home data transmission apparatus receives first upstream check data transmitted from said opposing data transmission apparatus, said home data transmission apparatus transmits second downstream check data, created by said home transmission apparatus using the first downstream check data, to the opposing data transmission apparatus, wherein said opposing data transmission apparatus has a first timer to produce, as said first upstream check data, a first timer value and said home data transmission apparatus having a second timer to produce, as said first downstream check data, a second timer value, wherein said opposing data transmission apparatus further including a first calculation means for performing a first calculation by predetermined functions using, as variables, both said second timer value sent from said home data transmission apparatus and said first timer value, and wherein said home data transmission apparatus further including a second calculation means for performing the second calculation by functions identical to said predetermined functions using, as variables, both said first timer value sent from said opposing transmission apparatus and said second timer value, so that second upstream data is created by data which is the same as the resultant data of the first calculation by said first calculation means, while said second downstream check data is created by data which is different from the resultant data of the second calculation by said second calculation means.

8. A plurality of data transmission apparatuses, each having a backup testing facility having a backup testing unit, wherein:

said first data transmission apparatus is operative in a working mode, to switch a working line to a backup line if an actual fault occurs in the working line, wherein both the working line and the backup line are connected to a second data transmission apparatus, said first data transmission apparatus is operative, in a test mode to activate a backup line test by said backup testing unit, by sending first downstream check data and receiving first upstream data between said first and second data transmission apparatuses, wherein said backup testing unit is operative to send back second downstream check data, when second upstream check data is sent from said second data transmission apparatus, which second downstream check data is created by incorrectly responding to said first upstream check data, so as not to perform a switching operation from the working line to the backup line.

9. A plurality of data transmission apparatuses as set forth in claim 8, wherein the backup testing unit comprises:

first means for receiving an instruction signal which instructs carrying out the backup line test from an external monitor, second means for judging if the instruction signal received by the first means is an instruction signal instructing activation of said test mode.

10. A plurality of data transmission apparatuses as set forth in claim 9, wherein said backup testing unit further comprises third means for sending first downstream check data to said second data transmission apparatus and receiving first upstream check data sent from said second data transmission apparatus, fourth means for carrying out a calculation using both said first downstream check data to be sent to the second data transmission apparatus and said first upstream check data received from the second data transmission apparatus to obtain said second downstream check data, fifth means for comparing a resultant value obtained by said calculation at said first data transmission apparatus with a resultant value which is obtained through identical calculation at said second data transmission apparatus and sent, as said second upstream check data, therefrom, sixth means for detecting if the above compared results coincide with each other and, when detecting coincidence, determines that said backup line is normal.

11. A plurality of data transmission apparatuses as set forth in claim 10, wherein the backup testing unit further comprises:

seventh means for producing and sending to said second data transmission apparatus calculation results different from the calculation results obtained by applying said predetermined calculation on the said sent first upstream check data at the fourth means when said sixth means judges that the backup line for connection with the second data transmission apparatus is normal.

12. A plurality of data transmission apparatuses as set forth in claim 10, wherein each data transmission apparatus comprises: a data generating means for applying further processing to a normal resultant value obtained by said calculation to generate said second downstream check data different from this normal resultant value, which second downstream check data is to be sent to said second data transmission apparatus when determining said backup line is normal.

13. A plurality of data transmission apparatuses as set forth in claim 8, wherein each data transmission apparatus comprises discriminating means for judging if an instruction signal has been given instructing execution of said test mode.

14. A plurality of data transmission apparatuses as set forth in claim 11, wherein each data transmission apparatus comprises: a determining means for judging that said backup line is normal and a switching operation from the working line to the backup line should not be performed.

15. A first data transmission apparatus connected with both a working line and a backup line which is switched from the working line if a fault occurs therein to perform a backup data communication with a second data transmission apparatus, the first data transmission apparatus comprising:

transmission means for sending data to said second data transmission apparatus;

reception means for receiving data from said second data transmission apparatus;

switching means for switching from said working line to said backup line and vice versa;

generation means for generating check data used for confirming whether the backup line is normal or not;

test means for receiving check data sent from said second data transmission apparatus and confirming whether the backup line is normal in accordance the thus received check data; and changing means for changing the check data to be sent to said second data transmission apparatus when a test for the backup line is to be achieved.

16. A first data transmission apparatus as set forth in claim 15, wherein the first data transmission apparatus further comprises forming means for forming further check data by a predetermined function using, as variables, the check data generated inside the first data transmission apparatus and received check data from said second data transmission apparatus, wherein second check data is sent to said second data transmission apparatus, the second check data being obtained by changing the said further check data by said forming means.

17. A first data transmission apparatus as set forth in claim 16, wherein said check data is generated based on a timer value, at an activation of said test for the backup line, given from timer means contained in each of the data transmission apparatus and the second data transmission apparatus.

18. A data transmission system including a home data transmission apparatus, an opposing data transmission apparatus and both a working line and a backup line connected between the above two data transmission apparatuses, each of the data transmission apparatuses is comprised of:
transmission means for sending data to the data transmission apparatus of the other party,
reception means for receiving data from the data transmission apparatus of the other party;
switching means for switching from said working line to the backup line and vice versa; and
generation means generating check data used for confirming whether the backup line is normal or not,
said opposing data transmission apparatus further including a comparing means for comparing the check data generated in the opposing data transmission apparatus with the check data generating in and sent from said home data transmission apparatus and activating said switching means in the opposing data transmission apparatus if a coincidence between the above two sets of check data is detected by said comparing means, so that the working line is switched to the backup line.

19. A method for communicating data between a home data transmission apparatus and an opposing data transmission apparatus via a working line or a backup line if a fault occurs, comprising the steps of:

(i) sending first downstream check data generated in said home data transmission apparatus to said opposing data transmission apparatus;

(ii) sending back to said home transmission apparatus first upstream check data generated, responding to the received first downstream check data, in said opposing data transmission apparatus;

(iii) comparing said second upstream check data and said second downstream check data in each of said home data transmission apparatus and said opposing data transmission apparatus to confirm whether the backup line is normal or not; and (iv) switching, if said second upstream check data and second downstream check data are found to coincide with each other at the above step for comparing, from the working line to the backup line.

20. A method as set forth in claim 19, wherein a step for confirming the match of the interface conditions between said home data transmission apparatus and said opposing data transmission apparatus is inserted before the step (i).

21. A method for communicating data between a home data transmission apparatus and an opposing data transmission apparatus via a working line or backup line if a fault occurs, comprising the steps of:

(i) communicating downstream check data and upstream check data between said two data transmission apparatus so as to conform that whether the backup line is normal or not; and (ii) sending dummy check data, if the backup line is normal, from said home data transmission apparatus to said opposing data transmission apparatus, so that the opposing data transmission apparatus fails, due to said dummy data, to activate a switching from said working line to said backup line.

22. A method as set forth in claim 21, wherein a step for confirming the match of the interface conditions between said home data transmission apparatus and said opposing data transmission apparatus is inserted before the step (i).

\* \* \* \* \*

UNITED STATES PATENT AND TRADEMARK OFFICE
CERTIFICATE OF CORRECTION

PATENT NO. : 5,689,513
DATED : Nov. 18, 1997
INVENTOR(S) : OKITA et al.

It is certified that error appears in the above-identified patent and that said Letters Patent is hereby corrected as shown below:

Col. 1, line 13, change "ba ckup" to --backup--.

Col. 6, line 52, after "station" insert --10--.

Col. 11, line 9 (Claim 2, line 7), change "raid" to --said--.

Col. 13, line 46 (Claim 14, line 2), change "claim 11" to --claim 8--.

Signed and Sealed this

Third Day of March, 1998

Attest:

BRUCE LEHMAN

Attesting Officer

Commissioner of Patents and Trademarks